K. B. RICE AND R. E. MUFFLY.
DEMOUNTABLE RIM.
APPLICATION FILED DEC. 5, 1919.
1,355,166. Patented Oct. 12, 1920.
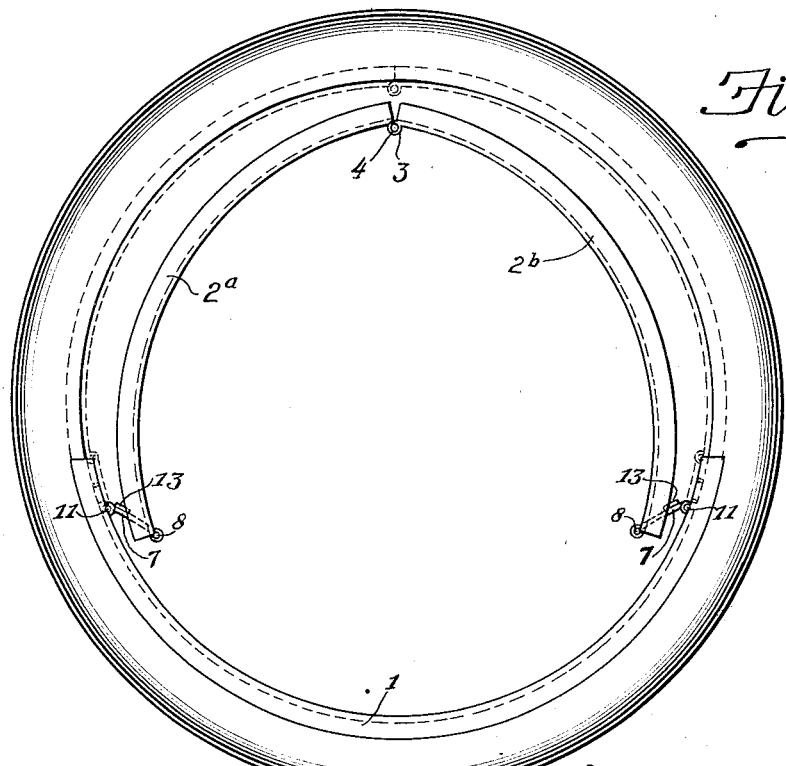
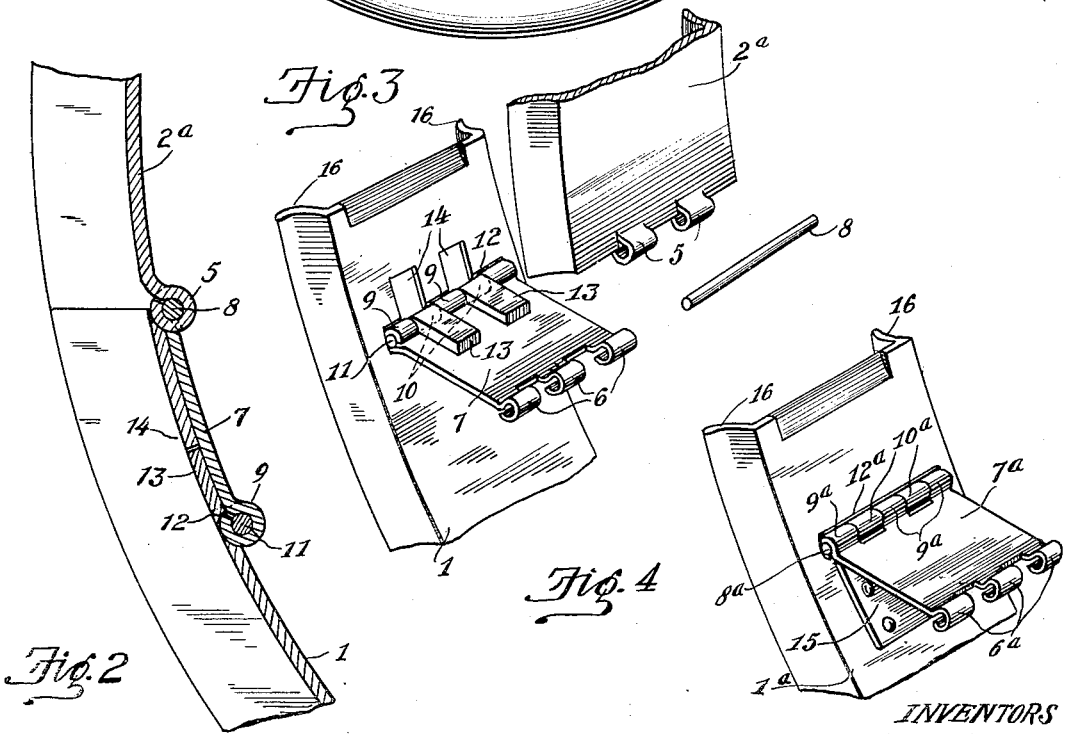
INVENTORS
Kenyon B. Rice and
Ross E. Muffly

UNITED STATES PATENT OFFICE.

KENYON B. RICE AND ROSS E. MUFFLY, OF CANTON, OHIO; SAID MUFFLY ASSIGNOR OF ONE-THIRD OF HIS RIGHT TO SAID RICE.

DEMOUNTABLE RIM.

1,355,166.     Specification of Letters Patent.     Patented Oct. 12, 1920.

Application filed December 5, 1919. Serial No. 342,736.

*To all whom it may concern:*

Be it known that we, KENYON B. RICE and Ross E. MUFFLY, both citizens of the United States, residing at Canton, in the county of Stark and State of Ohio, have jointly invented a new and useful Demountable Rim, of which the following is a specification.

This invention relates to an improvement in demountable tire rims, especially adapted for the wheels of automobiles.

Ordinarily these rims are made of a single split ring, the object being to permit of a partial collapse of the rim when removed from the wheel in order to reduce the circumference thereof and enable the tire to be easily slipped over the rim after which the rim is snapped back into circular form with its edges abutting.

To those skilled in the art the difficulties and disadvantages attending the use of the present forms of demountable rims are well known and the objects of the present invention are to provide a rim formed of three hinged sections which may be quickly and readily collapsed to allow the tire to be slipped over; to provide hinges upon the rim sections integral with said sections; and to generally improve and simplify rim constructions.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

The invention thus set forth in general terms is illustrated in the accompanying drawings forming part hereof, in which—

Figure 1 is a side elevation of the rim collapsed within a tire.

Fig. 2 is a sectional view through one of the hinge joints.

Fig. 3 is a detail perspective view of portions of adjacent ends of rim sections, the hinge pin being removed and the sections separated.

Fig. 4 is a detail perspective view of a portion of one of the sections, showing a modified form of hinge.

A practical embodiment of the invention is disclosed in the accompanying drawings, forming a part of this specification in which similar numerals of reference indicate corresponding parts throughout the several views.

The rim comprises three sections indicated by the numerals 1, $2^a$ and $2^b$, each of which is of arc shape and when these sections are joined together with their edges abutting they comprise a complete ring of circular formation.

The abutting extremities of the sections $2^a$ and $2^b$ are hingedly connected together, the hinge being formed integral with the two sections of the rim, suitable interlocking tongues 3 being stamped from each of these sections and pressed into tubular form as shown, a hinge pin 4 preferably of brass being located through said tubular portions.

The other extremity of each of the sections $2^a$ and $2^b$ is provided with a pair of spaced integral tangs 5 stamped from the end of the section and pressed into tubular form as shown in the drawings. These tubular portions 5 are arranged to register with a plurality of tubular portions 6 upon the hinged member 7, a brass hinge pin 8 connecting the hinge in the usual manner.

The hinge member 7 is provided upon its other end with similar tubular portions 9 arranged to register with the tubular portions 10 which are stamped from the rim section 1 near the end thereof, a hinge pin 11 being located through said tubular members 9 and 10 as shown.

It will be noted that the rim section 1 is countersunk as shown at 12 to allow the hinge joint formed by members 9 and 10 to be partly seated therein, thus materially reducing the obstruction upon the interior of the rim formed by the hinge joint. For the purpose of presenting a smooth surface upon the outer face of the rim, blocks 13 are carried by the hinge member 7 and arranged to be received within the apertures 14 in the rim section 1 which apertures are formed by stamping the tubular portions 10 from the rim section.

In Fig. 4 is illustrated a slightly modified form of the construction in which a two part hinge is used. In this construction the hinge member 7ª is the same in construction as the hinge member 7, excepting that it is not provided with the blocks 13. A hinge member is connected to the rim section 1ª by means of rivets or the like and is provided with spaced tangs bent into tubular form as shown at 10ª and arranged to interlock with the tubular portions 9ª upon the hinge member 7ª, a hinge pin 8ª being provided through the hinge joint. The rim section 1ª is provided with a counter-sunk portion 12ª to receive the hinge joint, thus formed. The usual end of the hinge member 7ª is provided with the spaced tubular portions 6ª arranged to register with tangs upon the adjacent section in the same manner as the portions 6 in the form illustrated in Figs. 1 to 3 inclusive.

In the collapsed portion the extremities of the sections 2ª and 2ᵇ overlap the extremities of the section 1 and it will be apparent that the rim will be easily and readily collapsed without any difficulty as there is no resistance to overcome. In the collapsed form the circumference of the rim is so reduced that the tire may be easily slipped over the rim to be removed or replaced thereon with a minimum of effort. The rim is of course provided with suitable flanges 16 to receive the tire in the usual manner.

We claim:—

A demountable tire rim comprising three sections, two of said sections being provided at adjacent ends with integral hinge portions, the other extremities of said two sections being connected to the third section, each by a hinge member, integral hinge portions stamped from said third section and hingedly connected to said hinge member, and blocks carried by the hinge member and arranged to be received within the apertures from which said hinge portions are stamped.

In testimony that we claim the above, we have hereunto subscribed our names.

KENYON B. RICE.
ROSS E. MUFFLY.